United States Patent [19]

Fornoni

[11] 4,188,184
[45] Feb. 12, 1980

[54] CONTINUOUS PROCESSES AND EQUIPMENT FOR TREATMENT OF SOLID SUBSTANCES

[76] Inventor: Luigi Fornoni, Rua Dr. Mario Freire, 226, Sao Paulo, Brazil

[21] Appl. No.: 853,042

[22] Filed: Nov. 21, 1977

[30] Foreign Application Priority Data

Apr. 13, 1977 [BR] Brazil .............................. 7702321[U]

[51] Int. Cl.² .............................................. F27B 15/00
[52] U.S. Cl. ......................................... 432/13; 34/171; 432/58
[58] Field of Search ....................... 432/13, 58; 34/165, 34/171, 175, 178

[56] References Cited

U.S. PATENT DOCUMENTS

| | | | |
|---|---|---|---|
| 56,348 | 7/1866 | Beach | 34/171 |
| 1,039,440 | 9/1912 | Puckett et al. | 34/171 |
| 1,554,780 | 9/1925 | Berrigan et al. | 34/171 X |
| 2,416,165 | 2/1947 | Evans | 34/171 X |
| 2,458,357 | 1/1949 | Evans | 34/171 X |
| 3,190,729 | 6/1965 | Emmett et al. | 34/171 X |
| 3,411,215 | 11/1968 | Fields | 34/165 X |
| 3,728,239 | 4/1973 | McDonald | 34/171 X |

FOREIGN PATENT DOCUMENTS

524687  5/1931  Fed. Rep. of Germany ............. 34/175

Primary Examiner—John J. Camby

[57] ABSTRACT

The present invention relates to a process and equipment for the continuous treatment of solid substances in general, with specific applications for the gasification of coals and shales and direct reduction of iron ores. The equipment comprises closed vessels to which working pressure may be applied internally equipped with systems of deflectors which make them capable of the treating of solid substances in a continuous manner even when they are in the form of damp or clayey compositions, the said substances are fed into the vessels in moving beds or layers under gravity, in a downward direction, and are contacted with gases or vapors generated in the treatment per se and/or introduced into the vessels and circulate co-currently or counter-currently to the solid substance flow. The equipment is especially suitable for the thermal treatment of said substances, releasing the gases and vapors form the layers, of any thicknesses, of said substances in the downward movement, provided with devices for the entrapment, contact and circulation of gases released in the thermal treatment, and also suitable for the thermal treatment of said substances, mixed with other solid substances, to cause chemical reactions with same and/or with the circulating gases.

31 Claims, 14 Drawing Figures

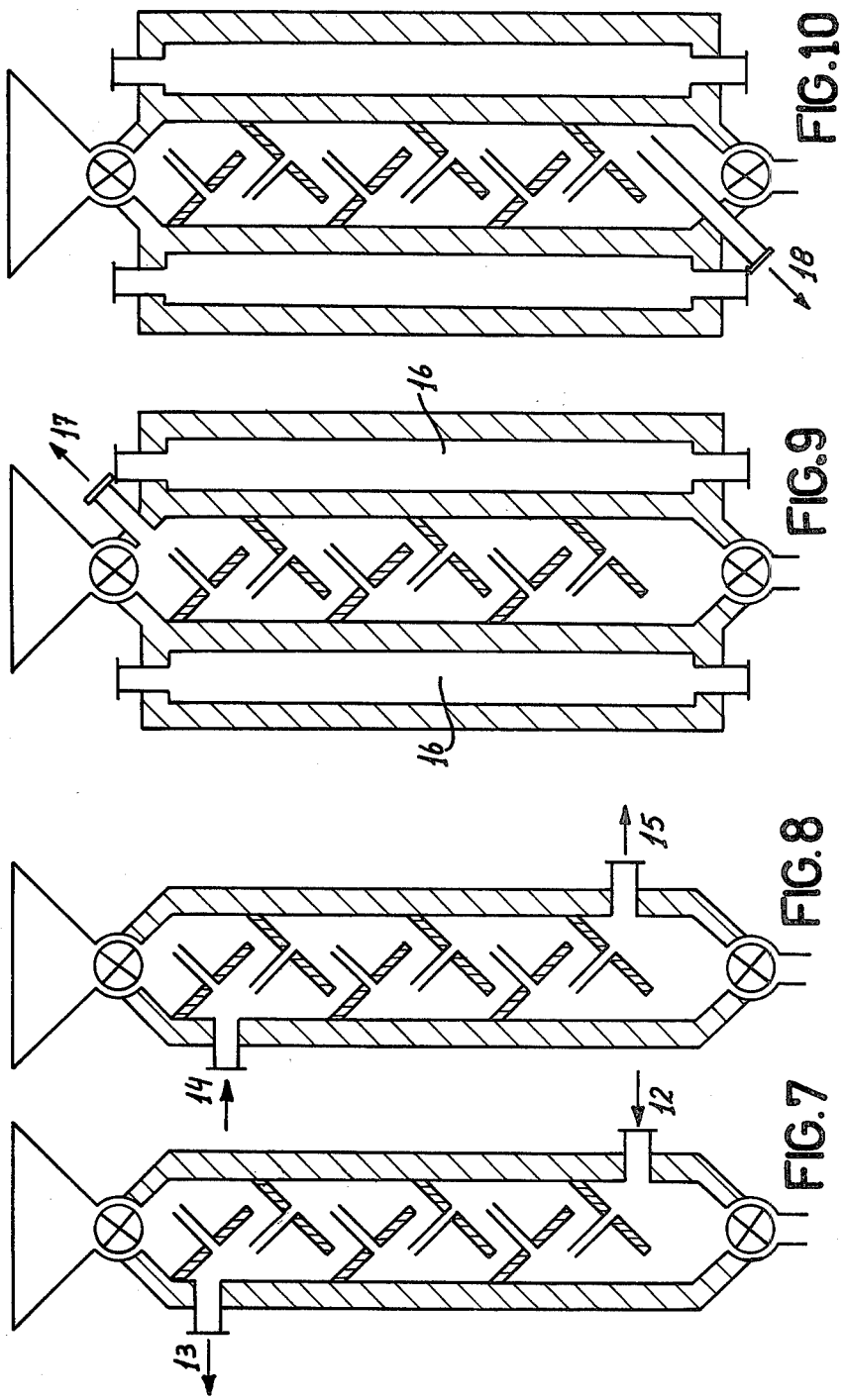

CONTINUOUS PROCESSES AND EQUIPMENT FOR TREATMENT OF SOLID SUBSTANCES

This invention refers to equipment using closed containers, operating without pressure or under any working pressure, and being entirely equipped with systems of deflectors which make them capable of the continuous treatment of solid substances, even when same are in the form of damp or clayey compositions, fed into the containers in beds or layers which are self-moving under the force of gravity in a downward direction, and put into contact with gases or vapors generated in the treatment itself and/or introduced into the containers and circulating with the current or against the current of movement of the solid substances.

This equipment is especially appropriate for the thermic treatment of the solid substances, with gases and vapors (hereinafter simply called gases) being let off from the layers, of whatever thickness, of said substances in a downward direction, and is provided with devices for the entrapment, contact and circulation of the gases released from the solids by the thermic treatment.

The equipment which is the subject of this invention is also useful for the thermic treatment of mixtures of different solid substances, with the object of generating chemical reactions with the substances and/or with the released circulating gases.

At the present time, among the greatest problems of the technology of the interaction of solid substances with gases, and the problem which arises in the forefront, is that of the permeability to the passage of gases through the solid substances in the state of damp compositions of the clayey type which become pulverulent, disintegrable on drying, with the subsequent formation of a powder.

In the prior art, several systems have been adopted to attempt to solve or avoid these problems, and these systems reveal clearly uneconomical or technically difficult.

As an example, one may indicate the systems of pre-treatment of such substances, by means of operations of drying, comminution, sieving, and briqueting, for eliminating the pulverulent fractions, and thus allowing the passage of the gases through the granulated compositions which result therefrom.

Other prior art systems require mechanical movements of the compositions, by means of rotating devices or containers, or systems of belt or screw conveyors, to allow the gases to be released, and establish contact with the substances being treated.

Other systems provide for the complete pulverization of the solid substances into very fine particles, which provide for the injection thereof into super heated vessels, resulting in the instant formation of gases and the fusion of the residual solid substances.

Other systems, provide for the injection of gases and vapors under pressure into the lower part of the containers, below supporting grates for the layers of solid substances which are dried and finely milled, in such a manner as to maintain a fluid bed, which allow the gases to pass therethrough.

Heretofore, however, the thermic treatment of mineral carbons of the bituminous and sub-bituminous type, and of bituminous and pyrobituminous shales, through the operations of pyrolysis and gasification, have not been practised in an economically feasible manner with the great majority of existing carbons and shales which exist in the world, because of their insufficient permeability to the passage of the gases of the compositions and of the cinders generated in the process or introduced therein.

The present invention provides apparatus for the treatment of the substances mentioned above, with or without previous processing, and which are moving under the force of gravity in a continuous manner inside containers, jointly with the generation, releasing, entrapment, injection and circulation of gases.

The present invention specifically provides apparatus which makes possible the continous operations of pyrolysis and direct gasification on the composition of said coals and shales.

The present invention further provides apparatus for direct reduction of iron ores, e.g., powder forms, to spongy iron, with the use of gasificable coals as the reducing element, without the minerals being previously pelleted.

The present invention also provides apparatus which permits the continous treatment, with gases, of substances which are impervious to the passage of said gases.

This invention further provide apparatus for the ustulation, with gases and in a continuous manner, of substances which are impenetrable by the gases.

The present invention further provides apparatus for the oxidization or reduction of solid substances which are impermeable to the gases.

This invention also provides apparatus which allows the thermal cracking and shift conversion operations of the gases generated through the pre-determined passage across super-heated zones of the containers.

This invention provides apparatus for the combustion of coals and shales in a continuous manner.

The present invention is characterized by equipment for the continuous treatment of solid substances, including damp substances of the clayey type, impermeable or slightly permeable to the passage of gases and vapors, such equipment comprising a closed container or chamber, equipped internally with systems of deflectors formed by angularly disposed plaques to provide slipping therealong of said solid substances according to the present invention there is provided apparatus for the continuous treatment of solid substances, including damp substances of the clayey type, impermeable or only slightly permeable to the passage of gases and vapors, said apparatus comprising a closed vessel internally equipped with a system of deflectors comprising plaques disposed at an angle to the vertical to provide slipping therealong of said solid substances.

The invention also provides a method for the continuous treatment of solid substances including damp substances of the clayey type, impermeable or only slightly permeable to the passage of gases and vapors which method comprises passing the gases or vapors into a vessel having a system of deflectors including plaques disposed at an angle to the vertical over which deflectors the solid substances are caused to slide due to gravity.

The upper surface of the deflecting plaques support layers of substances under treatment which slip from one deflector to another, in a zig-zag direction, down to the final discharge system, in a continuous manner and at a speed which is regulatable by the operation of an extractor device.

The method for thermal treatment according to the invention may include the following steps: continuously feeding solid substances of general composition and damp or clayey composition into the container; providing for the solid substances to continuously flow downwardly by force of gravity toward the bottom of the container; allowing the substances to form continuously mixing and slipping layers supported and engaged by the deflectors; heating the slipping layers to a predetermined temperature so that gases are released from the heated flowing substances; entrapping the released gases in the free spaces formed under the deflector; and allowing the entrapped gases to circulate throughout the layers of treated substances by means of the interval circuit of gases formed by the interconnecting the various free spaces in the container.

A characteristic of the apparatus is the fact that the deflectors, which impart a zig-zag movement to the substances, at the same time enhance the mixing and the homogenizing of substances, and this includes the renewal of the portions which come into direct contact with the walls which transmit heat.

Another significant characteristic of the apparatus which is the subject-matter of this invention consists of the fact that the angularly disposed plaques, built in the form of an angle or inlaid into the walls of the containers, form a kind of tile, underneath which there is a free and empty space, which serves for the entrapment and circulation of the gases. These free and empty spaces are open to intercommication by means of ducts or the juxtaposition of the deflectors with each other, thus making possible the circulation of the gases in contact with the substances being treated inside the containers. By interconnecting the various free spaces, an internal circuit of gases is formed having zig-zag flow paths for circulation of gases throughout the treated substances.

Another characteristic, furthermore, consists of the fact that the thickness of the moving layers or beds may be regulated by the distance between the extremities of the deflectors and the surfaces of the deflectors immediately below.

Another significant characteristic of this apparatus consists of the fact that the movement and the speed of slipping of the layers of solid substances are variable, and regulated simply by the speed of the operation of the extraction of the residues, set up at the lower end of the containers.

Yet another characteristic consists of the fact that the flow of the gases in the empty and intercommunicating spaces below the deflectors can be established in the upwards direction, or against the current of the solid substances, or in the downwards direction, with the current of the substances, or even in any direction, according to the localization of the drains or outlet conduits for gas inside the containers, going to outside collectors.

Another characteristic of the apparatus which is the subject-matter of this invention, consists of the fact that the heating of the substances under treatment can be carried out by a direct or indirect method.

The generation of direct heat, inside the containers, can be carried out by the combustion with the air or the oxygen of the substances in treatment, or by fuels (for example: gases) introduced into the containers by means of conduit inlets extending from the outside or exterior of the container to the interior thereof.

Another modality of direct heating of the substances under treatment, compatible with the apparatus of this invention, consists of solid fuel materials introduced and fed together with the substances under treatment, into the inside of the containers. The solid materials, which are super heated, are mixed with the substances under treatment. The combustion of the heated solid materials intermixed with the substances under treatment effects direct heating of the layers of solid substances within the container.

Another modality of heating consists of introducing super-heated combustion gases from the exterior of the container into the internal circuits of the gases, by means of inlet conduits affixed at the upper or lower parts of the containers. The combustion of the heated gases and the gases released by the treated substances effects direct heating of the layers of solid substances.

The systems of direct heating inside the containers are characterized by the fact that the combustion chambers can be placed in the upper part or lower part of the containers.

With regard to the indirect heating of the solid substances under treatment in the containers, the transmission of the heat can be carried out through the heat-conducting walls of appropriate containers of metallic materials, such as Incoloy alloys, or refractory materials or fire-proof materials of silica or silica-aluminiums, aluminums, or carborundum.

With regard to the indirect heating of the solid substances under treatment in the containers, the transmission of the heat can be carried out by any of the well-known systems of indirect heating such as heating coils, double jackets etc., in contact with the treated substances.

Another characteristic of the apparatus of this invention, consists of the fact that the temperature of the various zones of the containers can have a pre-established grading according to the pre-established operations of thermic treatment of the solid substances and the gases (for example, solid, liquid or cracking operation).

Another characteristic of the apparatus of this invention consists of the fact that, in the case of direct heating, the containers can be placed in batteries, alongside each other, and in the case of indirect heating, they can also be placed in batteries with heating chambers interposed between them.

The batteries have no limitations as far as the size and number of the elements which make them up are concerned.

The equipment of invention can be arranged for operation under pressure, in which case the vertical cylinderical metallic structure is the most appropriate form of constuction, without modifying at all the system of internal sets of deflectors inside the containers.

In the most simple form of construction, the apparatus consists of chambers with a parallelepiped form with rectangular cross-sections, the side walls of which are equipped with deflectors which consist of plaques disposed at an angle, alternately on opposite walls, and on which the solid substances are supported. The deflectors, being formed as a kind of tiles, are spaced apart from each other at a predetermined distance (related to the thickness of the moving layers of substances), so as to define a free or empty space underneath each of them. The layers of the solid substances conform to the free surfaces as per the angle, which in its turn depends on the coefficient of internal friction characteristic of each substance under treatment and its granulometry, in such a manner as not to fill the empty spaces formed under the deflectors, but only to limit them.

In operation, the layers which are supported on the plaques of the angled deflectors are kept in continuous motion by the operation of the mechanisms of the extractor set up at the lower part of the containers, which, extract the material from the lowest layers on which the superimposed layers are supported in continuous manner, and generate the motion in the flow from the top to the bottom.

Further details of this invention can be better understood by the explanation of the enclosed drawings, in which.

Figure 6A:
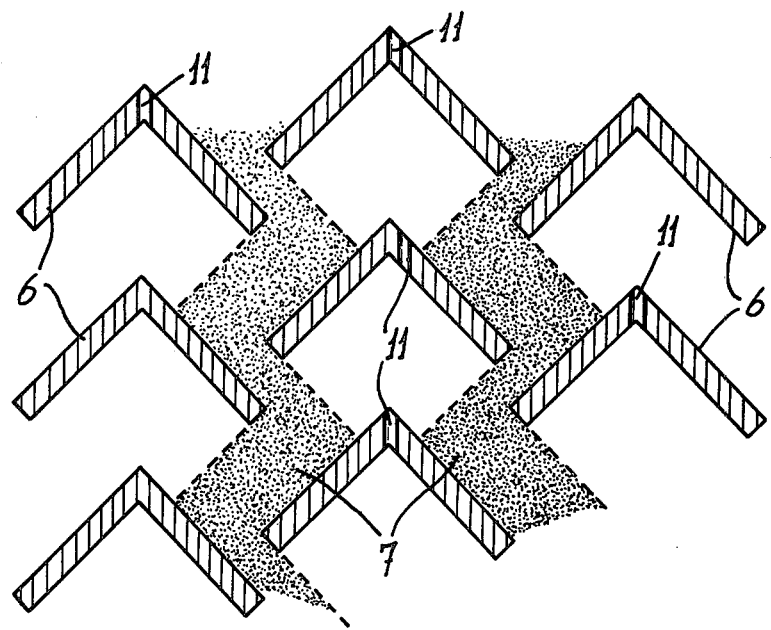
FIG. 6 shows the intercommunication system between the free spaces, produced by the juxtaposition of the deflectors inlaid into the walls of the container.
Figure 12:
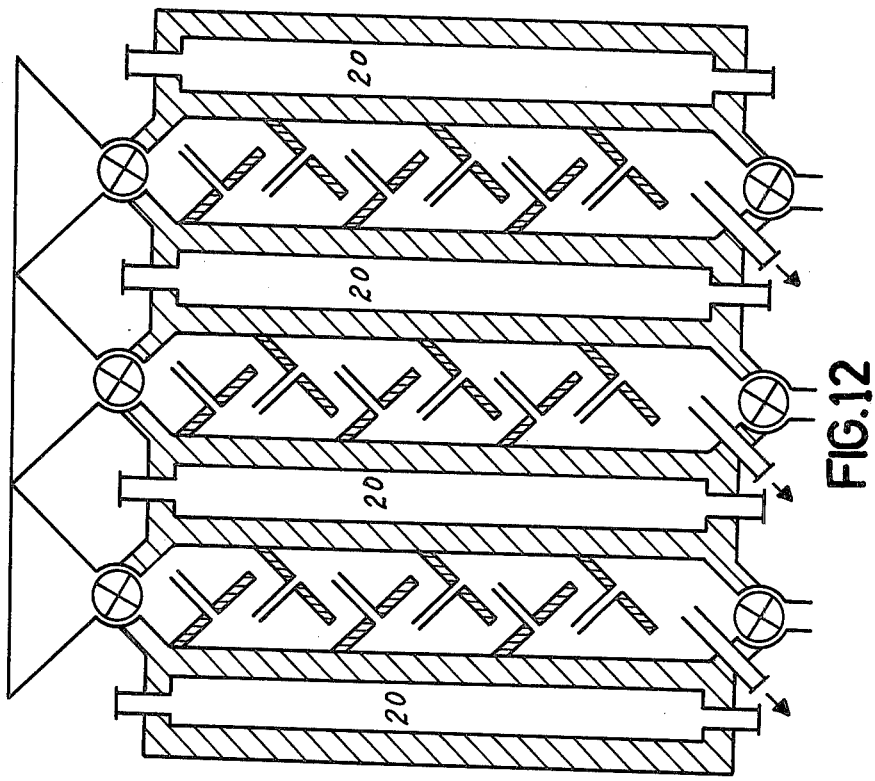
Figure 11:
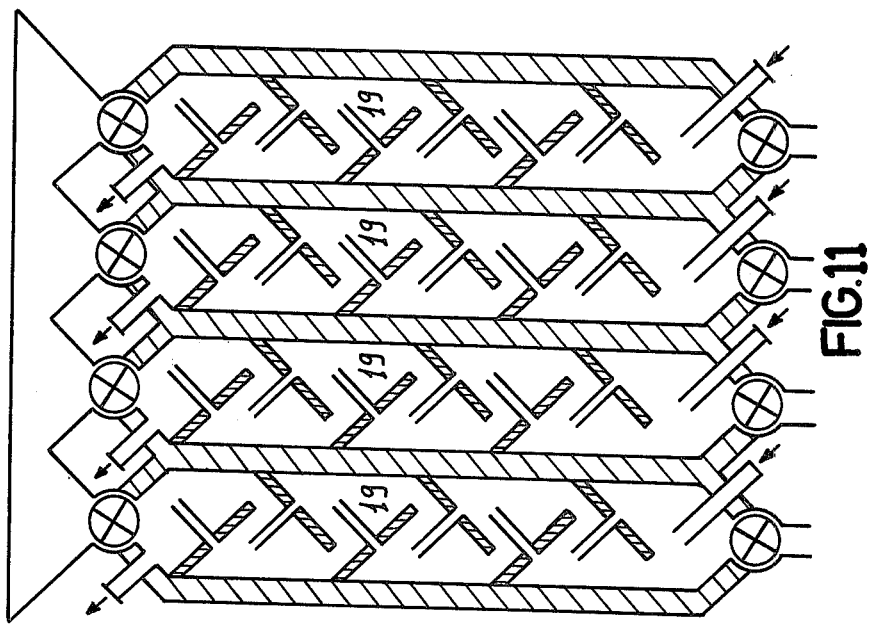
Figure 13:
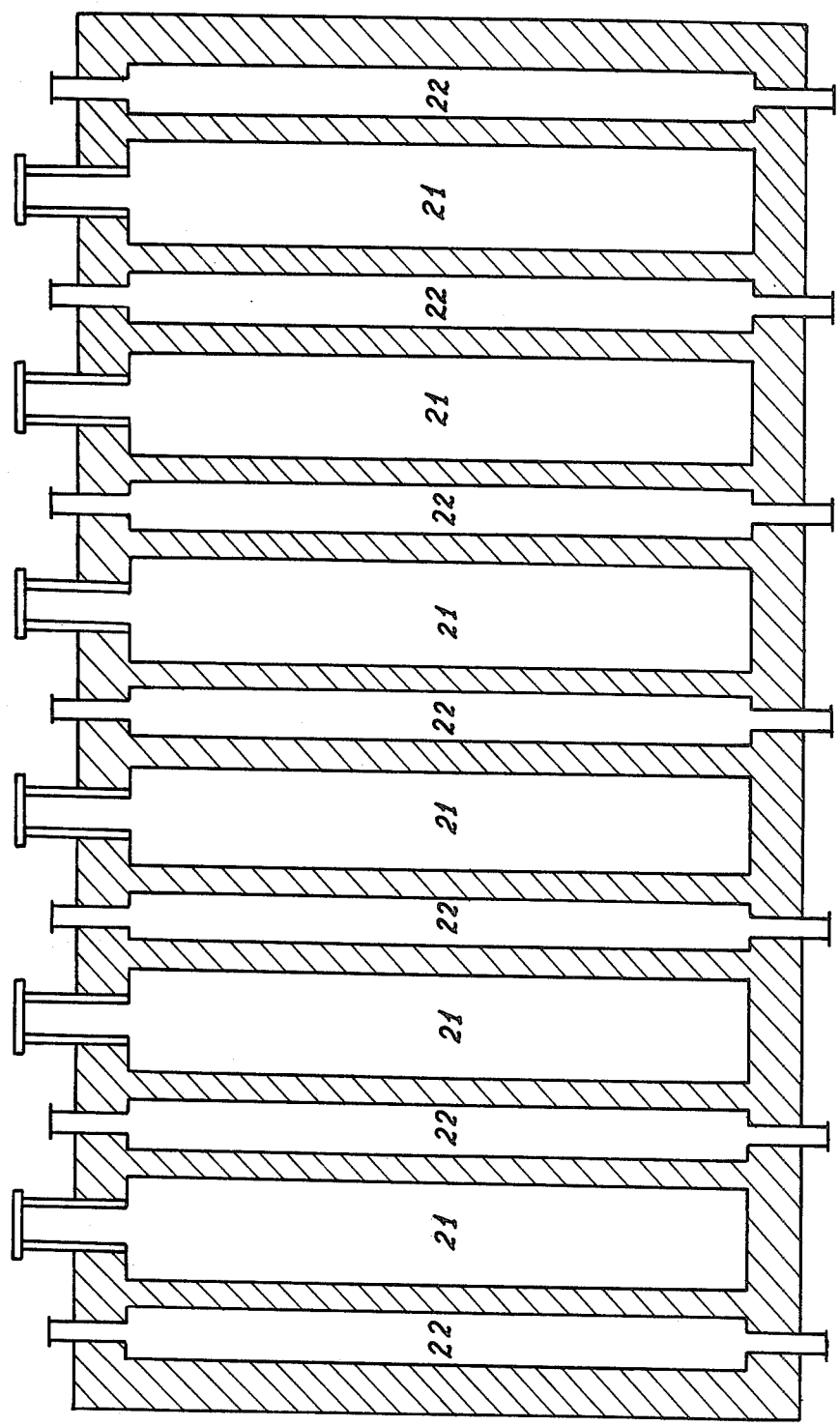

FIG. 6a also shows the intercommunication system between the free spaces, produced by the juxtaposition of the deflectors consisting of two blades;

FIG. 7 shows a system for direct internal heating, with an upper outlet conduit for the gases;

FIG. 8 shows another system for direct internal heating, with a lower outlet conduct for the gases;

FIG. 9 shows a system of indirect heating, with an upper outlet for the gases;

FIG. 10 shows another system of indirect heating, with a lower outlet for the gases;

FIG. 11 shows schematically a battery made up of four containers, with direct heating and an upper outlet for the gases;

FIG. 12 shows schematically a battery of three containers, with indirect heating and a lower outlet for the gases; and FIG. 13 shows the plan view of a battery of six containers with indirect heating.

Figure 1:
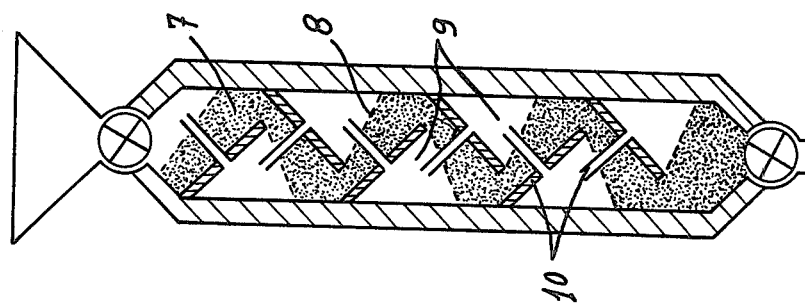
FIG. 1 shows schematically the cross section of a small-sized unit, with two sets of deflectors.

Referring to the drawings, FIG. 1 shows, in a schematic transverse cross section, the construction of a unit for treatment, in a closed container, in its most simple form, consisting of walls of refractory material, 1, showing the mounting of the deflectors 2 into the walls of refractory material. The treatment unit includes a hopper 3 dispersed above the container for introducing the substance under treatment, a feeder 4 for cooperating with the hopper and an extractor 5 for removing the solid substances after the treatment.

Figure 2:
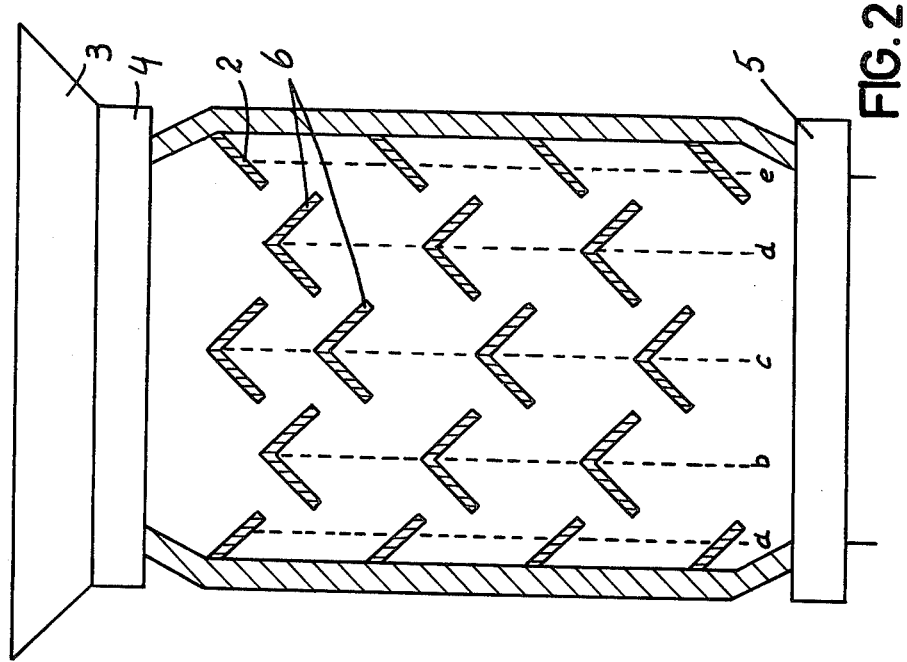
FIG. 2 shows schematically the cross section of a larger unit, with five sets of deflectors (a,b,c,d,e)

FIG. 2 shows the construction of a larger-size container, with deflectors 2 similar to those in FIG. 1, and the deflectors 6 applied to the internal part of the container, and constructed in the form of an angular tile, with two blades disposed at an angle to form an inverted V-shaped deflector. It also shows the sets of deflectors (a,e) with one blade 2 and the sets (b,c,d) of two blades in the form of an angle 6.

Figure 3:
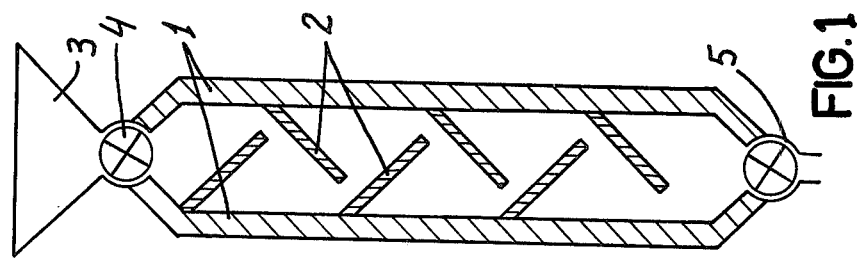
FIG. 3 is the reproduction of FIG. 1, filled with a substance and showing the ducts of intercommunication of the free spaces, and the formation of the layers of the solid substance under treatment.

FIG. 3 is a diagrammatic representation of FIG. 1, in which the layers 7 of substance under treatment are indicated, and showing the natural surfaces or natural angle of repose of the upper delimitation 8 of the layers, and also the free spaces 9 formed under the deflectors, and the ducts 10 for the intercommunication of said free spaces. It is observed that the layers are sloped according to the sloping of the deflectors, and these, in their turn, are sloped as per the angle of rest of the material to be treated.

Figure 4:
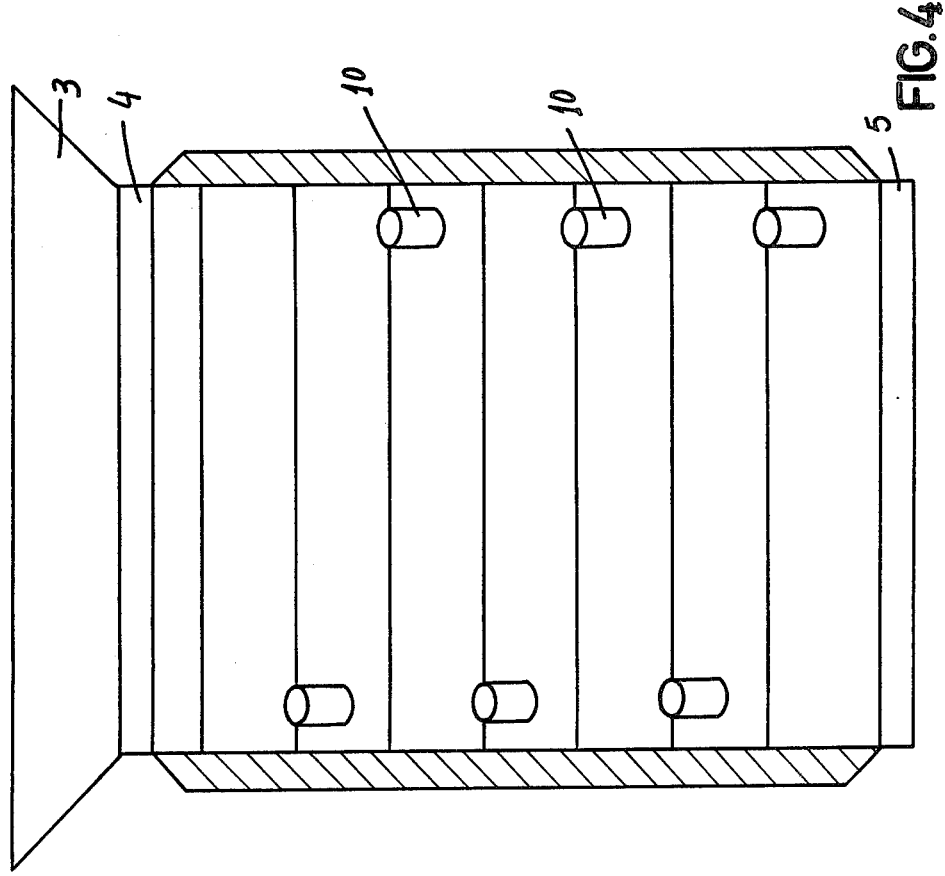
FIG. 4 shows schematically the longitudinal cross section of FIG. 1, and the alternating positioning of the intercommunication ducts.

FIG. 4 represents the schematical longitudinal cross section of a typical container, showing, the alternated position of the ducts 10 to increase the passage of gases from one layer to the other.

Figure 5:
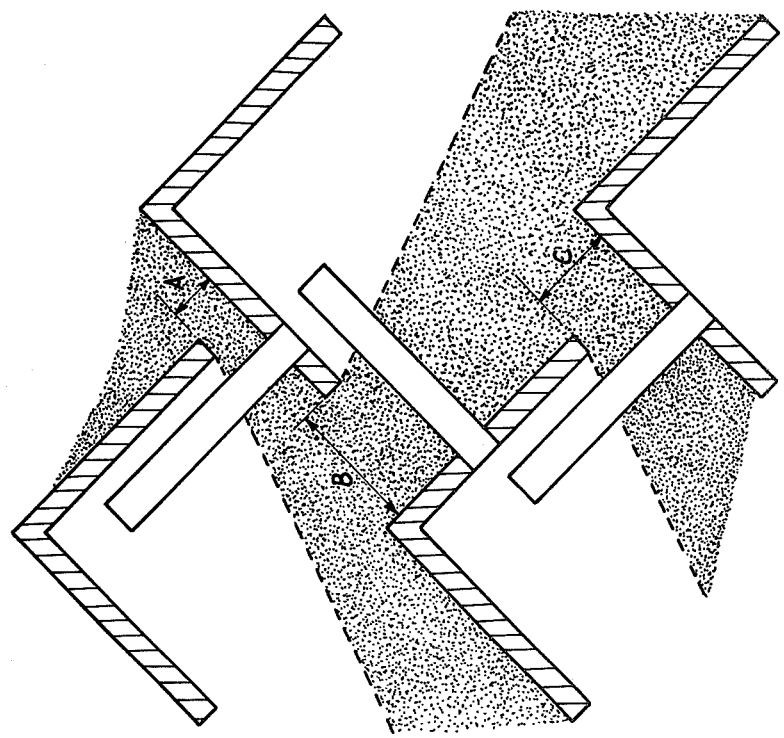
FIG. 5 shows schematically the variation of the thickness of the layers as per the distances, A, B, C of the deflectors.

FIG. 5 shows, in detail, how the layers are formed with various thicknesses, depending on the distances A, B, C, between the deflectors.

Figure 6:
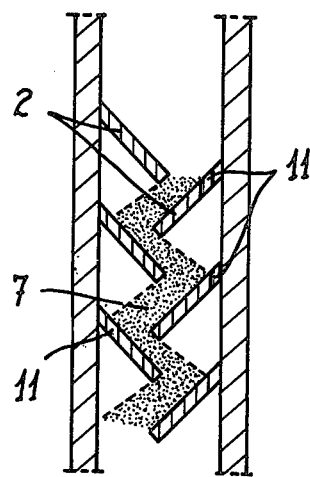

FIG. 6 shows the possibility of the formation of intercommunicability of the free spaces of the deflectors, by means of a system of juxtaposition of the apexes of the upper angle of the deflectors 2 with one blade, mounted on the wall. The free spaces are not covered by the layers of the substances 7. The deflectors (2, 6) have alternate openings 11 disposed at alternate positions or points therein, for the gases to pass through the openings 11 may be disposed on the single blade deflectors (2) adjacent the end thereof being sealed in the wall.

FIG. 6a shows the same, for deflectors 6 constructed with two blades forming an inverted V-shaped deflector having an apex directed upwardly and penetrating the adjacent free space of the deflector immediately above it.

FIG. 7 is the reproduction of FIG. 3, with the indication of the inlet 12 for fuels and/or combustibles in the lower part of the container, and the outlet 13 for the gases in the upper part of same.

FIG. 8 represents the same construction as FIG. 3, additionally showing the inlet 14 for fuel and/or combustibles, in the upper part of the container, and an outlet 15 in the lower part of same.

FIG. 9 shows the same construction as FIG. 3, with indirect heating by means of side heating chambers 16 and the outlet 17 for gases at the top.

FIG. 10 shows the same construction as FIG. 9, with the outlet 18 for gases at the bottom.

FIG. 11 is the schematic representation of a set of four containers 19 forming a battery.

FIG. 12 is a schematic representation of a battery formed by a set of three containers, with indirect heating obtained by interposing heating chambers 20.

FIG. 13 shows, schematically, the plan of a battery of six containers 21 with the interposing of the heating chambers 22.

In this invention, the system of deflectors is installed inside of containers, in alternating sets to provide the continuous mixing of the layers of solid substances, and the alternating contact of the layers of substance with the walls of the containers when same transmit heat, with the pre-established distances between the deflectors in relationship with the thicknesses of the layers of solid substance passing through the apparatus being determined on the basis of the characteristics of the solid substances, that is, the flow characteristic of the substance, and the permeability characteristic of the substance.

The deflectors are of simple construction, and they are formed of refractory or metallic materials, and they are supported on the refractory or metallic walls of the containers.

Ducts 10, and openings 11, which allow passage of gases, are made of refractory or metallic materials. These allow the intercommunication of the free spaces 9, which form under the deflectors 2, 6.

The use of angle deflectors, as taught by the present invention, enables, in the most elementary and efficient manner, the feeding and the stratification of the solid substances of the clayey or pulverulent type.

Applying heat to the container, either internally or externally, enables the generation of gases from permeable or semi-permeable substances.

The process consists of the heating of layers of predetermined thickness of solid self-moving substance, which is the subject to a slipping movement towards the bottom of the container. The movement is regulated by the speed of operation of the power-driven extractor, for removing solid substance after treatment, by the speed of movement of the power-driven feeder, which introduces the substance into the container, and by the angular disposition of the deflectors 2, 6.

Gases are released from the heated flowing solid substance, and the gases are entrapped in the free spaces 9 left under the deflectors 2, 6. Circulation of the gases, in the direction from the bottom of the container to the top, and vice-versa, accompanied by the close contact between the gases and the layers of the solid substance, is accomplished by ducts 10 extending upwardly from the surface of the deflector 2, to a point higher than the thickness of the layer 8 of the substance being treated.

In an alternate form of the invention, when angled inverted V-shaped deflectors 6 are used, vent opening 11 disposed in alternate positions, in the apex of the angled deflector permit gases accumulated above the surface of the flowing material to pass through the container. The course followed by the gases under the deflectors, and in contact with the surface of the substance being treated, provides the requirement specifically demanded in gasification processes of coals and schists, and processes involving direct reduction of iron ore. This arrangement also allows for the possibility of injecting water vapor or steam ($H_2O$) into the gas extraction circuits, in any zone of the gasification process where this may be appropriate, for example, within the lower part of the container. This arrangement also allows for the carrying out of the most efficient operation of thermal cracking in the final passage of the carbonization gases (e.g., carbon dioxide $CO_2$) which have a high content of substances which might be required to be cracked in certain zones of the container (e.g., within the upper part of the container) which can be subjected to specific (predetermined) internal pressure or without the use of internal pressure.

The present invention provides a simple process and apparatus for treatment of self-moving solid substances without the need for transporting or conveying machinery during the processing stage, and offers a solution to problems that have existed in equipment and processes heretofore used. The utilization of the process and apparatus of the present invention has enabled the obtaining of industrial results of the highest significance and importance.

What is claimed is:

1. In an apparatus for continuous thermal treatment of solid substances of a general composition and damp or clayey composition, the apparatus including a closed vertical container made of refractory material and having at its upper end an inlet for solid substances, and at its lower end an outlet for discharge of treated substances, and a plurality of downwardly inclined deflectors angularly disposed within said container for supporting continuously slipping layers of the solid substances moving downwardly under the action of gravity, the improvement which comprises said deflectors being spaced apart from each other at a predetermined distance, so as to define a free space under each deflector for accumulation of gases therein, and passageway means disposed in said deflectors, for interconnecting one free space to another for passage of accumulated gases therebetween, and forming thereby an internal circuit for circulation of gases within said container.

2. The improved apparatus according to claim 1 in which said deflectors are in the form of single blades successively disposed on opposite sides within said container, and are overlapped at staggered intervals to create a zig-zag flow path, on a longitudinal vertical axis, of said slipping layers of solid substances which pass by gravity through said container.

3. The improved apparatus according to claim 1, in which said deflectors are formed of two angularly connected planar blades having the apex of connected blades directed upwardly and penetrating into the free space of the deflectors immediately above thereof, said deflectors being disposed in such alternating fashion as to create a zig-zag flow path, on a longitudinal vertical axis of said slipping layers of solid substances which pass by gravity through said container.

4. The improved apparatus according to claim 2, in which said passageway means comprise openings disposed in alternate positions in the single blades deflectors, adjacent to the end thereof sealed in the walls of said container, for interconnecting one free space to another so as to circulate gases therebetween, and forming an internal circuit of gases within said container.

5. The improved apparatus according to claim 3, in which said passageway means comprise openings disposed in alternate positions in the apexes of said double planar blades for interconnecting one free space to another so as to circulate gases therebetween, and forming a zig-zag flow path for gases flowing in the internal circuit of gases within said container.

6. The improved apparatus according to claim 1, in which said passageway means comprise a plurality of ducts, at least one of each disposed in each of said deflectors for interconnecting one free space to another so as to circulate gases therebetween, and forming an internal circuit of gases within said container.

7. The improved apparatus according to claim 6 in which said ducts are arranged in said container in alternate positions relative to said deflectors, each one of said ducts being open at both ends thereof for interconnecting one free space to another, one end of each of said ducts being perpendicular to and sealed in a respective one of said deflectors, for connecting an adjacent free space, and the other end thereof extending upwardly through the thickness of an adjacent one of said layers of solid substances, and into another free space so as to form an internal circuit of gases having a zig-zag flow path for the gases.

8. The improved apparatus according to claim 1, further comprising power driven extracting means disposed at said discharge outlet for removing treated solid substances for said container.

9. The improved apparatus according to claim 1, further comprising direct heating means for heating the solid substances within said container, said heating means disposed within said container.

10. The improved apparatus according to claim 1 further comprising a hopper disposed above said container for continuously feeding said solid substances into said container, and means for cooperating with said hopper for introducing said solid substances into said container for thermal treatment therein.

11. The improved apparatus of claim 1 in which said container comprises indirect heating means which include side heating chambers disposed on the sidewalls of said container.

12. The improved apparatus for claim 1, further comprising means for the application of working pressure inside said container.

13. The improved apparatus of claim 1 further comprising a plurality of said container, assembled together to form a battery of containers.

14. The improved apparatus according to claim 13 in which said battery of containers includes interposing heating chambers for indirect heating between the respective containers.

15. A method for continuous thermal treatment of solid substances of general composition and damp or clayey composition, which method uses an improved apparatus especially suitable for thermal treatment of solid substances, the apparatus including a closed vertical container having upper and lower inlet and outlet means; a plurality of downwardly inclined deflectors angularly and alternately disposed within said container for supporting and engaging continuously slipping layers of solid substances, said deflectors spaced apart from each other at a predetermined distance so as to form free spaces under the deflectors for accumulation of gases therein, passageway means disposed in said deflectors for interconnecting said free spaces, and thereby forming an internal circuit of gases within said container, and power driven extracting means for discharging treated substances outside of said container, the method comprises the steps of continuously feeding solid substances of general composition and damp or clayey composition into said container, causing said solid substances to continuously flow downwardly by force of gravity, generating a continuous motion in the flow of said substances from top to bottom of said container so as to form continuously mixing and slipping layers of a predetermined thickness, supporting and engaging said layers of solid substances by said deflectors, so as to impart a zig-zag movement to said solid substances, and enhance the mixing and homogenizing of the same, heating said layers of solid substances to a predetermined temperature, so that gases are generated and released from the heating flowing substances, entrapping the released gases in the free spaces formed under said deflectors, and circulating the entrapped gases throughout said layers of solid substances by means of the internal circuit of gases formed in said container, causing thereby close contact between said gases and said layers of solid substances.

16. The method of claim 15, in which said solid substances are impermeable.

17. The method according to claim 15, in which said solid substances are only slightly permeable.

18. The method of claim 15, further comprising directly heating said layers of solid substances by heating means disposed within said container.

19. The method of claim 15, further comprising heating said layers of solid substances by direct contact with hot gases of combustion produced within said container.

20. The method of claim 15, further comprising introducing into said container heated combustion gases such as air and oxygen by means of suitable conduits extending from the exterior of said container into the interior thereof and circulating said heated combustion gases in the internal circuit of gases, causing direct heating of said layers of solid substances.

21. The method of claim 20, further comprising directly heating said layers of solid substances by the combustion of heated solid materials intermixed and fed into said container together with said solid substances under treatment.

22. The method according to claim 20, further comprising directly heating said layers of solid substances by the combustion of said heated gases introduced into said container from the outside thereof, and the gases released by the treated substances and entrapped in the internal circuit of gases.

23. The method according to claim 15, further comprising indirectly heating said layers of solid substances by heating means disposed on the outside of said container which includes heat conducting walls.

24. The method according to claim 15, further comprising circulating the gases released by said layers of solid substances, and which are trapped in the internal circuit of gases in an upward direction countercurrently with the downward movement of said layers of solid substances.

25. The method according to claim 15, further comprising circulating the gases released by said layers of solid substances, and which are trapped in the internal circuit of gases, in a downward direction, concurrently with the direction of movement of said layers of solid substances.

26. The method according to claim 15, in which the gases released by the treated solid substances and which are trapped in the internal circuit of gases are circulated both in upward and downward directions, said gases moving concurrently with the downwardly moving solid substances in the upper part of said container and countercurrently to the direction of movement of the solid substances, in the lower part of said container.

27. The method according to claim 26, in which said solid substances that undergo thermal treatment are bituminous and sub-bituminous coals or lignites or pyrobituminous oil schists and in which said solid substances are carbonized within the upper part of said container and gasified within the lower part thereof by means of carbonic gas ($CO_2$) and water vapor ($H_2O$) introduced into the internal circuit of gases from the outside of said container.

28. The method according to claim 27, in which said layers of solid substances undergo thermal treatment with gases and water vapor introduced into the internal circuit of gases from the outside of said container.

29. The method according to claim 26 in which iron ore in powder form is directly reduced to iron sponge by using gasificable coal as the reducing agent without requiring the iron ore to be previously pelletized.

30. The method according to claim 26, in which the thermal treatment of said solid substances within said container is carried out without internal working atmospheric atmospheric pressure.

31. The method according to claim 26, in which thermal treatment of said solid substances within said container is carried out at a predetermined internal working pressure.

* * * * *